United States Patent [19]

Aurell

[11] 4,131,440
[45] Dec. 26, 1978

[54] QUICK-CONNECT-AND-DISCONNECT ASSEMBLY

[75] Inventor: Eskill Aurell, Växjö, Sweden

[73] Assignee: Aktiebolaget Svenska Flaktrabriken, Nacka, Sweden

[21] Appl. No.: 850,098

[22] Filed: Nov. 10, 1977

[51] Int. Cl.² ............................................ B01D 46/04
[52] U.S. Cl. .................................. 55/302; 55/341 R; 403/237
[58] Field of Search ............. 55/302, 341 R; 403/234, 403/237

[56] References Cited

U.S. PATENT DOCUMENTS

| 2,611,160 | 9/1952 | Hanesse | 403/237 |
| 3,513,638 | 5/1970 | Young | 55/302 X |
| 3,565,264 | 2/1971 | Guiher | 403/237 X |

FOREIGN PATENT DOCUMENTS

| 2421846 | 11/1975 | Fed. Rep. of Germany | 55/302 |
| 1289890 | 2/1962 | France | 55/302 |
| 2245869 | 4/1975 | France | 403/237 |

*Primary Examiner*—Frank W. Lutter
*Assistant Examiner*—Kathleen J. Prunner
*Attorney, Agent, or Firm*—Dann, Dorfman, Herrell and Skillman

[57] ABSTRACT

A quick-connect-and-disconnect assembly is illustrated in a bag filter environment. The assembly is used to mount a nozzle pipe on a rectangular girder. The pipe includes a mounting clip with a body having a support foot forming an inverted L-shaped configuration to engage over an upper corner of the girder. The body engages flush against the girder. At the bottom, the clip has a latching lip to engage behind a depending flange on the girder, and the lip is urged upwardly into latching engagement by an elongated coil-spring retainer which is resiliently engaged between the support foot and the top wall of the girder. Means is provided on the flange to positively locate the nozzle pipe at the proper position along the length of the girder.

6 Claims, 8 Drawing Figures

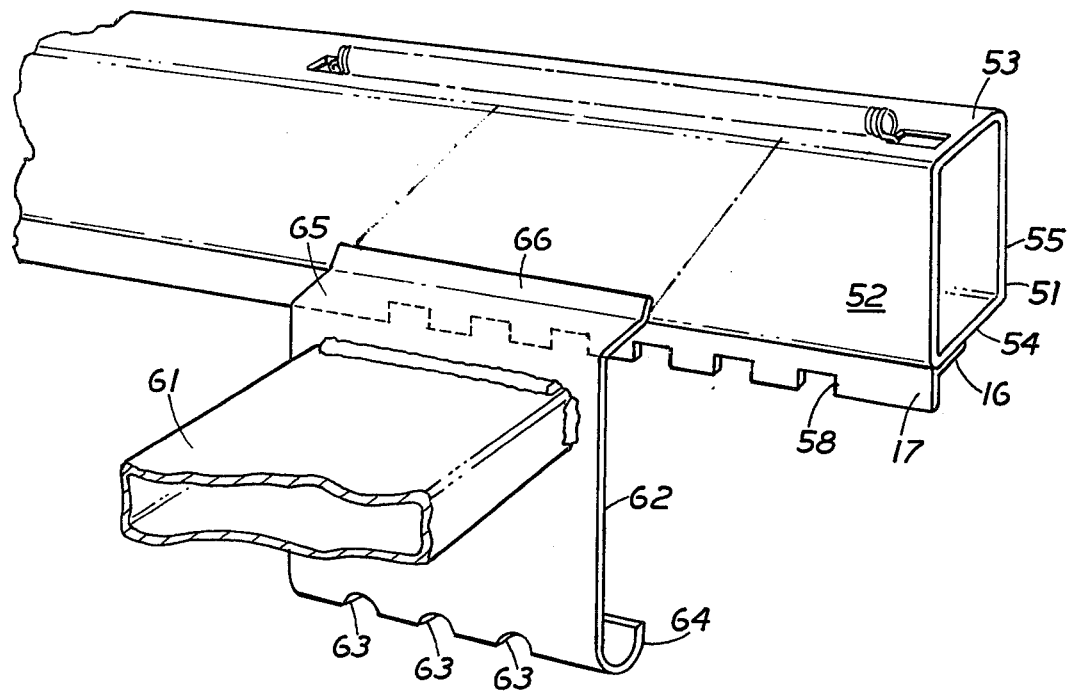
FIG. 5
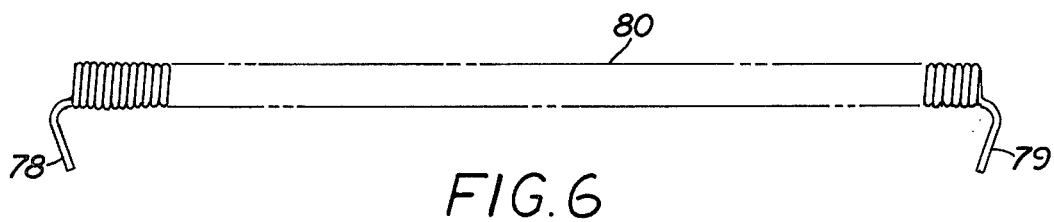
FIG. 6
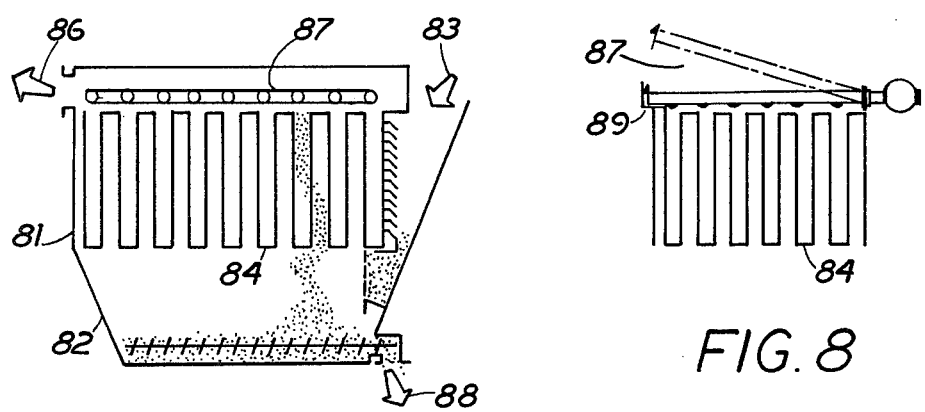
FIG. 7
FIG. 8

QUICK-CONNECT-AND-DISCONNECT ASSEMBLY

The present invention relates to a quick-connect-and-disconnect fastening arrangement for mounting a transverse element onto a longitudinal girder or other support. The invention has particular application to the mounting of a transverse nozzle feed pipe onto a longitudinal girder in a bag-filter apparatus.

A primary object of the invention is to provide an arrangement which permits easy connection and disconnection of a transverse element in proper position in a structural assembly without the use of tools and individual fasteners which are difficult to release after prolonged periods in a dust-laden atmosphere.

In particular, the present invention provides a quick-connect-and-disconnect assembly employing a minimum number of parts and which is resiliently retained in assembled condition.

In particular, the present invention contemplates the use of an elongated coil spring as a resilient retainer which retains the elements latched together and is readily manipulated to afford quick release of the elements when required.

Specifically, the present invention provides an elongated structural element of generally rectangular outline in transverse section, an inverted L-shaped clip member adapted to engage over at least one corner of the rectangular element and a resilient retainer in the form of a spring-like coil element operable to be engaged between the clip and the support to retain the clip in latching engagement and which may be diplaced to permit disengagement thereof.

All of the objects of the invention are more fully set forth hereinafter with reference to the accompanying drawing, wherein:

FIG. 5 is a perspective view illustrating a modified embodiment of the assembly;

FIG. 6 is a view of the spring retainer shown in FIG. 5; and

FIGS. 7 and 8 are schematic representations of another bag filter apparatus embodying the present invention.

Figure 1:
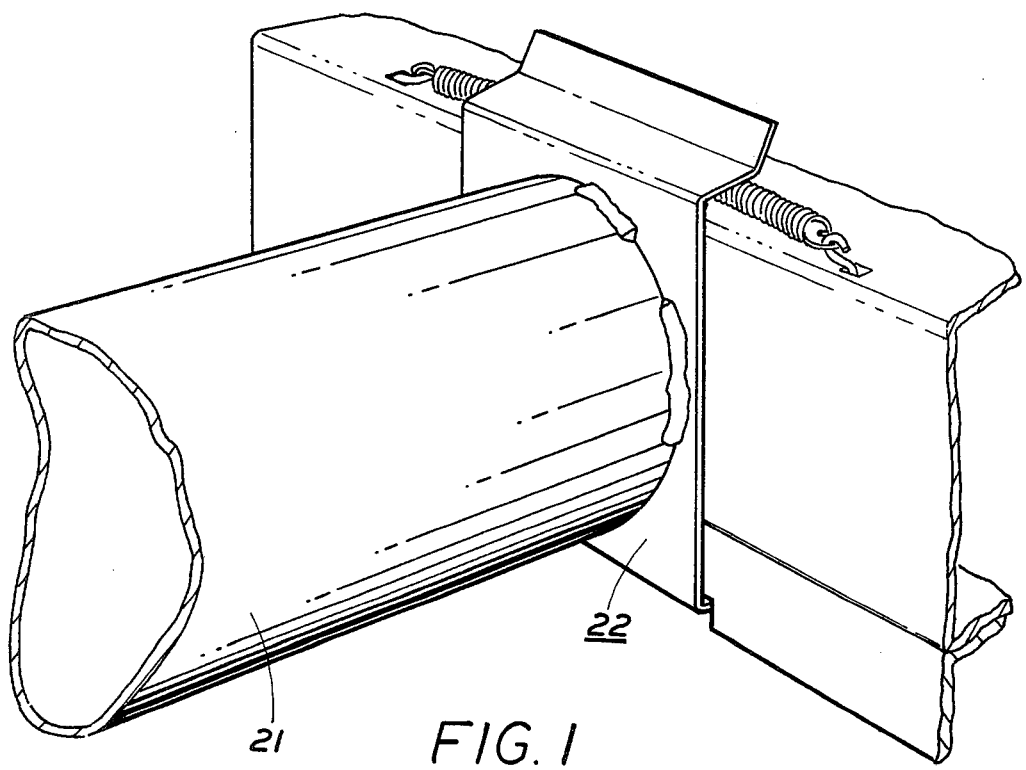
FIG. 1 is a perspective view of an assembly in accordance with the present invention with the parts coupled.
Figure 2:
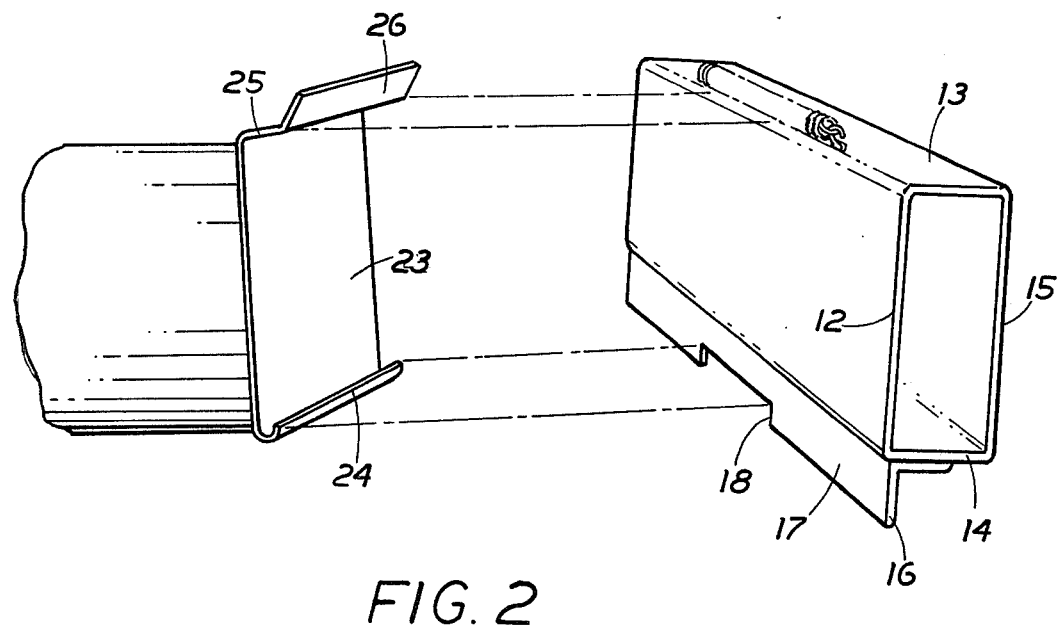
FIG. 2 is a fragmentary exploded perspective view of the assembly uncoupled.
Figure 3:
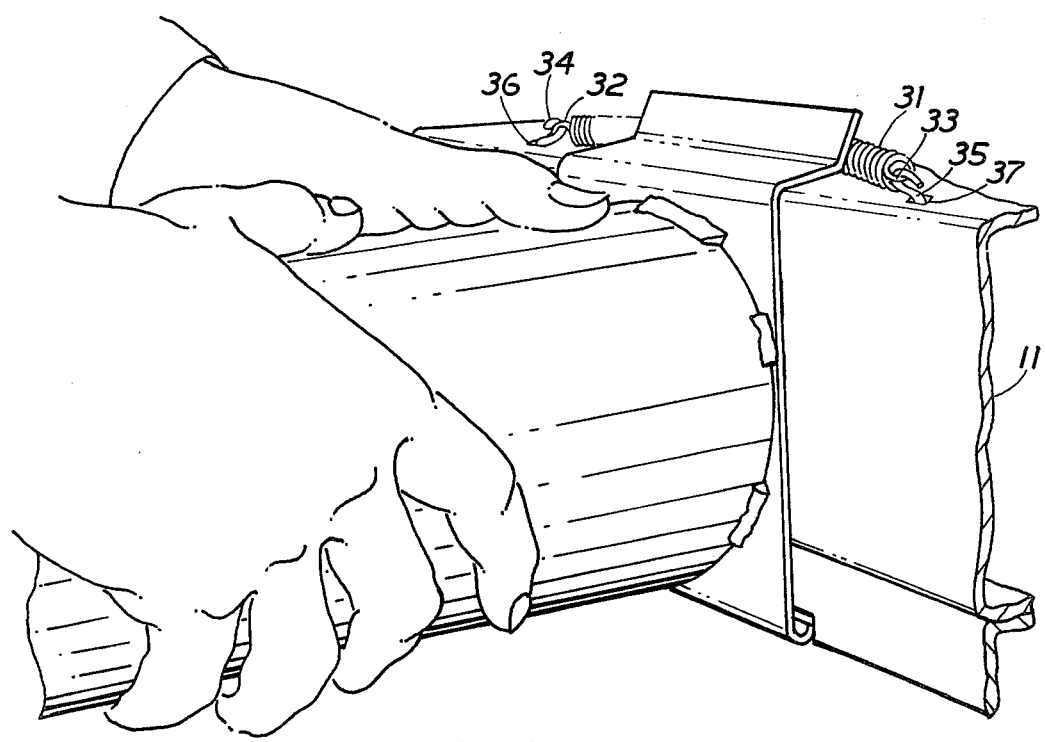
FIG. 3 is a perspective view showing the assembly in an intermediate stage between coupling and uncoupling.

Referring to the drawing, the assembly illustrated in FIGS. 1-4 inclusive comprises a longitudinal girder 11 of a bag filter or the like. In the present instance, the girder is a box beam having a forward upright wall 12 and a top wall 13 disposed perpendicular thereto, a bottom wall 14 parallel to the top wall 13 and a rear wall 15 parallel to the wall 12. The beam is closed on all sides as shown in FIG. 2. An angle member 16 is secured to the bottom wall 14 to provide a depending flange 17 substantially coplanar with the wall 12. As shown in FIG. 2, the flange is provided with a cutout 18 at the location where a transverse nozzle pipe is to be attached.

The transverse nozzle pipe is shown at 21 and is provided with a clip member 22 at its free end. The clip member is generally L-shaped having a body portion 23 adapted to be mounted flush against the wall 12 and the flange 17. The body portion 23 preferably provides a sealed closure for the nozzle pipe 21 which is connected to an air supply at its other end. At its lower end, the body portion 23 has a reversely-turned latching lip 24 having a length corresponding to the length of the cutout opening 18 so as to snugly engage therein. At its upper end, the body portion 23 is provided with a foot 25 disposed substantially perpendicular to the body portion 23 and terminating along its free edge in an angular toe portion 26. The vertical extent of the body portion 23 between the foot 25 and the lip 24 corresponds to the spacing between the top wall 13 and the flange 17 of the longitudinal girder. Thus, as indicated by the broken lines in FIG. 2, the clip member may be displaced into engagement with the girder so that the lip portion 24 engages in the cutout 18 and the toe portion 26 rides over the top wall 13 of the girder (see FIG. 3).

Figure 4:
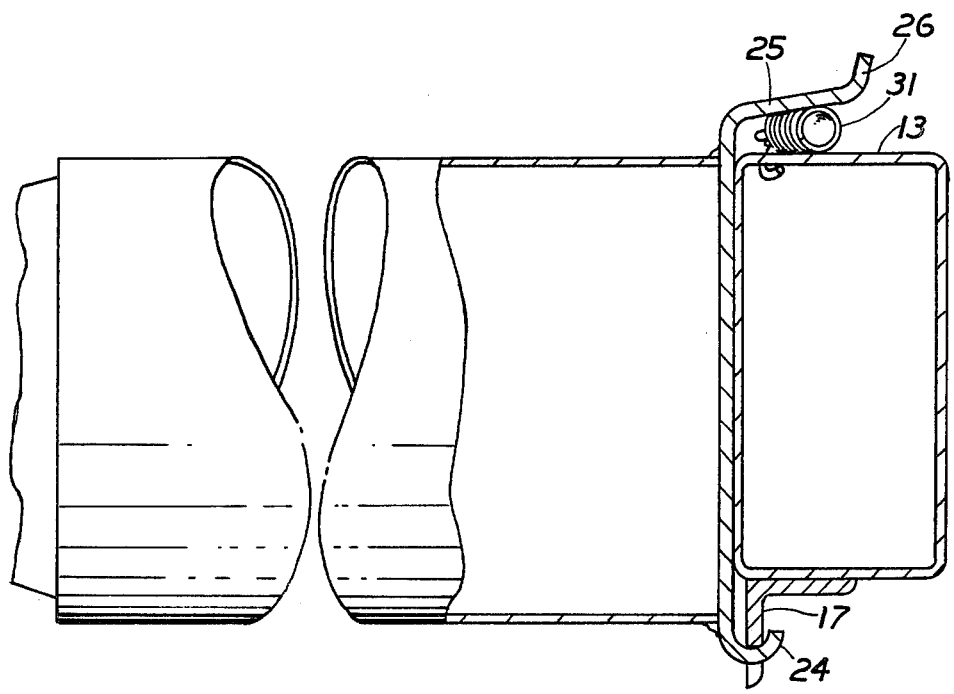
FIG. 4 is a transverse sectional view of the assembly as shown in FIG. 1.

In order to engage the lip 24 with the flange portion within the cutout 18, the clip element 22 is displaced upwardly as shown in FIG. 4 so that the lip 24 engages behind the flange 17 as shown. To hold the clip in this upwardly-displaced position, a resilient retainer is provided on the top wall 13 to engage between the top wall 13 and the foot 25. In the present instance, the retainer comprises a coil spring 31 which is anchored at its opposite ends 32 and 33 by hook members 34 and 35, respectively, engaging in openings 36 and 37 in the top wall 13. The resilient nature of the coil spring 31 permits the spring to be displaced by the toe portion 26 as the clip is engaged against the girder 11 with its body portion 23 against the front wall 12 of the girder. With the body portion engaged flush against the wall, the clip may be raised relative to the girder to allow the spring element 31 to retract into position between the foot 25 and the top wall 13, thereby retaining the clip in its upwardly-displaced position shown in FIGS. 1 and 4.

The recess 18 in the flange 17 insures that the feed pipe is positioned properly along the length of the girder and retains the nozzle pipe against displacement longitudinally of the girder.

The flexible nature of the coil spring 31 permits the spring to conform to the spacing between the clip foot 25 and the wall 13 so as to allow normal manufacturing tolerances. The individual coil elements of the coil spring may be canted at an angle in order to provide a reduced clearance between the foot 25 and the top wall 13 when necessary. The resilient character of the spring and the tension provided by the anchoring of the opposite ends in the apertures 36 and 37 insures that the spring remains in position under the normal vibrating conditions within a bag filter.

When it is desired to release the nozzle pipe 21 from the girder 11, it is a simple expedient to stretch the spring 31 so as to disengage it from under the foot 25 and permit the clip element 22 to be displaced downwardly and unlatch the lip 24 from the flange 17 in the recess 18. Thus, the assembly operates as a sliding latch wherein the lip 24 engages the flange 17 as a latch element engages a keeper and the spring 31 serves as a retainer for resiliently maintaining the clip latched to the girder.

It should be noted that the slidable latching movement afforded by the present invention permits the nozzle feed pipe 21 to be retained in a horizontal position as it is engaged with the girder. In this fashion, the assembly avoids the need to tilt one element relative to the other which permits the assembly to be engaged in a confined space where there is not a large free area for manipulating the elements.

FIGS. 5 and 6 illustrate a second embodiment of the invention wherein a rectangular transverse element is mounted on a longitudinal girder by a clip element. In the present instance, the girder 51 has a closed-wall construction comprising a front wall 52, a top wall 53, a bottom wall 54 and a back wall 55. An angle member is mounted on the bottom wall 54, as indicated at 56, to provide a depending flange 57 substantially coplanar with the wall 52. In the present instance, the flange is provided with recess means in the form of a series of notches 58. In the top wall 53, a pair of cutouts 76 and 77 are provided in which terminal hooks 78 and 79, respectively, of a retainer spring 80 are mounted.

In this embodiment of the invention, there is a rectangular transverse member 61 which is designed to be latched to the girder 51 and, to this end, the member 61 is provided with an end clip 62 having a latching lip 64 along its lower edge. The lip 64 is provided with a series of detents 63 therealong which are adapted to register with and engage in the notches 58 to prevent lateral displacement of the clip 62 longitudinally of the girder 51. At the upper edge of the clip 62, a retainer foot 65 is provided having an upturned toe portion 66 which cooperates with the retainer spring 80 to maintain the latching lip 64 engaged with the flange 57 and the detents 63 engaged in the notches 58.

This embodiment of the invention provides a simple structure which permits the transverse member to be latched to the longitudinal member at any one of several selected locations along its length. This embodiment is particularly suitable for latching members where a limited degree of adjustment of the transverse member longitudinally of the girder is desired. To this end, the retaining spring 80 is substantially longer than the width of the clip 62 and the notches are positioned to be coextensive with the spring so as to permit a limited degree of longitudinal adjustment of the transverse member 61 without sacrificing the quick-connect-and-disconnect characteristics of the assembly.

The assembly of the present invention is particularly adapted for use in bag filters where the nozzle assembly overlies the bag elements of the filter.

FIGS. 7 and 8 illustrate diagrammatically a bag filter structure in which the invention may be applied. In FIG. 7, the structure is shown having a housing 81 providing an intake chamber 82 into which dust-laden air may be introduced as indicated by the arrow 83. The air flows through the porous bag elements 84 into the discharge chamber 85 and the clean air is discharged as indicated at 86. Bag elements 84 separate the intake chamber 82 from the discharge chamber 85. Nozzle pipes 87 are provided to impinge jets of air interiorly of the bag elements to dislodge the dust from the outer surface thereof for collection in the bottom of the chamber 82 and for discharge therefrom as indicated by the arrow 88.

FIG. 8 shows a manner of removing the nozzle assembly 87 to permit access to the bag elements 84 for replacement when needed. As indicated in broken lines, a nozzle pipe 87 may be released from a girder 89 at one end and pivoted upwardly to afford access to the bag elements 84 which underlie the nozzle pipe. Periodically, the bag elements must be replaced and the quick-connect-and-disconnect features of the present invention permit ready displacement of the nozzle elements to permit easy replacement of the bag elements of the filter.

While particular embodiments of the present invention have been herein illustrated and described, it is not intended to limit the invention to such disclosure, but changes and modifications may be made therein and thereto within the scope of the following claims.

I claim:

1. A quick-connect-and-disconnect assembly comprising a transverse element latched to a longitudinal element, said longitudinal element having a top wall and a front wall disposed substantially perpendicular to one another, said front wall having along the edge opposite said top wall a depending flange portion, said transverse element having an L-shaped clip, said L-shaped clip being inverted to have a body portion adapted to engage flush against the front wall of the longitudinal element and a foot portion disposed substantially at right angles to said body portion and adapted to overlie said top wall of the longitudinal member, said clip having along the edge opposite said foot portion a latching element comprising a reversely-bent lip adapted to engage behind a free edge of said flange portion when said body portion is engaged flush against said front wall, the distance between said foot portion and said latching element being greater than the height of said front wall to enable vertical displacement of said clip while engaged flush with said front wall whereby when said latching element is engaged behind said flange, portion clearance space is provided between said foot portion and said top wall, and on one of said longitudinal and transverse elements a resilient retainer operable to fill the space between said foot portion and said top wall and to thereby resiliently maintain said latching element in engagement with said flange portion.

2. A structure according to claim 1 wherein said resilient retainer comprises a coil spring extending longitudinally of said longitudinal element and anchored in said top wall on opposite sides of said clip whereby the tension in said spring urges said retainer spring into the clearance space between said foot portion and said top wall, said spring being extendable to be disengaged from said clearance space and to permit downward displacement of said clip to disengage said latching element from said flange portion.

3. A structure according to claim 1 wherein said flange portion is provided with recess means engageable with said latching lip to position said clip longitudinally at a given position longitudinally of said longitudinal element.

4. A structure according to claim 3 wherein said recess means is coextensive with said clip and the entire reversely-bent lip fits within said recess means.

5. A structure according to claim 3 wherein said recess means comprises a series of notches disposed along the length of the longitudinal element in said depending flange portion, said latching lip including detent means operable to engage with said series of notches.

6. In a bag filter comprising a housing having an intake chamber and a discharge chamber with porous bag elements separating the chambers, a transverse nozzle pipe assembly mounted on a longitudinal girder in said discharge chamber to impringe jets of air against said bag elements to dislodge dust therefrom, and a quick-connect-and-disconnect assembly according to claim 1 mounting the transverse element comprised of said transverse nozzle pipe assembly to the longitudinal element comrpised of said longitudinal girder.

* * * * *

UNITED STATES PATENT OFFICE
CERTIFICATE OF CORRECTION

Patent No. 4,131,440              Dated  December 26, 1978

Inventor(s) Eskill Aurell

It is certified that error appears in the above-identified patent and that said Letters Patent are hereby corrected as shown below:

Sheet 3, Fig. 5 should be amended to show reference numerals 56, 57, 76 and 77 as follows:

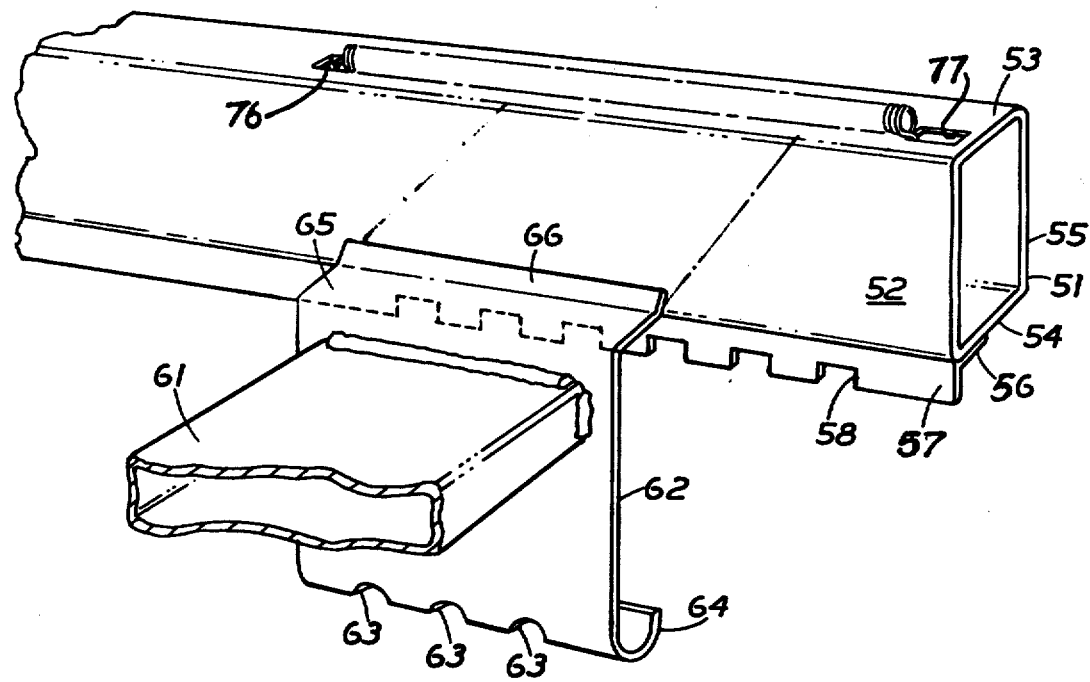

FIG. 5

UNITED STATES PATENT OFFICE

CERTIFICATE OF CORRECTION

Patent No. 4,131,440   Dated December 26, 1978

Sheet 3, Fig. 7, should be amended to show reference numeral 85 as shown:

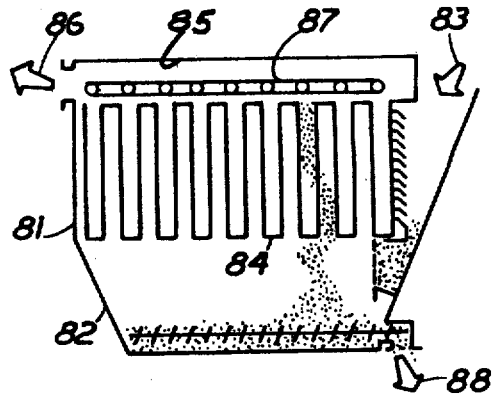

FIG. 7

In the Heading, the Assignee should read as follows:
--[73] Assignee: Aktiebolaget Svenska Flaktfabriken, Nacka, Sweden --;
Column 1, line 32, "diplaced" should be --displaced--;
Claim 1, line 28, "flange, portion" should be --flange portion--;
      line 30, before "on one" insert --a resilient retainer--;
      line 31, delete "a resilient retainer";
Claim 6, last line, "comrpised" should be --comprised--;

Signed and Sealed this

Twelfth Day of June 1979

[SEAL]

Attest:

RUTH C. MASON
*Attesting Officer*

DONALD W. BANNER
*Commissioner of Patents and Trademarks*